Dec. 5, 1961                SHO TAKAHAMA                3,011,419
DEVICE FOR AUTOMATICALLY RETURNING A COUNTER AND
                   EJECTING A MAGAZINE
              Filed March 23, 1959

INVENTOR

SHO TAKAHAMA

BY *Stanley Wolden*

ATTORNEY

United States Patent Office 3,011,419
Patented Dec. 5, 1961

3,011,419
DEVICE FOR AUTOMATICALLY RETURNING A COUNTER AND EJECTING A MAGAZINE
Sho Takahama, Nishinomiya-shi, Japan, assignor to Yashica Co., Ltd., Tokyo, and Kabushiki Kaisha Konan Kamera Kenkyu-Jo, Hyogo-ken, Japan, corporations of Japan
Filed Mar. 23, 1959, Ser. No. 801,287
Claims priority, application Japan May 6, 1958
8 Claims. (Cl. 95—31)

The present invention relates to means incorporated in a photographic camera for securing a magazine in place in the camera, and mechanism cooperable with said means to reset a counter dial to zero both upon the introduction of a magazine into the camera and the ejection therefrom, the magazine being ejected from the camera by spring means.

Automatic resetting of a counter dial to zero when loading cameras with film is self-evidently desirable and is conventionally achieved only by rather complex means. Similarly, the positioning of a magazine carrying film in a camera usually entails opening the camera and placing the magazine within the same.

It is a primary object of the present invention to provide means for simply retaining an automatically rejecting a magazine in and from a camera, respectively, at the same time coupling said means to the film counter system so that upon either insertion or ejection of the magazine said counter system will be reset to the zero position.

These and other objects are attained in the preferred embodiment of the present invention here described by providing a recess in one corner of the magazine which is stepped so as to provide a hook-like wall and which, when the magazine is inserted in a camera body against the bias of an ejection spring, engages a pin pivotally mounted on a lever and spring biased to the engaged portion, said lever carrying a contact portion which, when said pin climbs up the step of said recess, contacts a portion of a detent pawl, releasing the same from engagement with a ratchet wheel pinned to the counter disk which is then returned by a zero biasing spring to the zero position.

Other objects and a fuller understanding of the present invention may be had by referring to the following detailed description and claims, taken in conjunction with the accompanying drawing which illustrates preferred embodiments thereof, it being understood that the foregoing statement of the objects of the invention and the brief summary thereof is intended to generally explain the same without limiting it in any manner.

Figure 1:
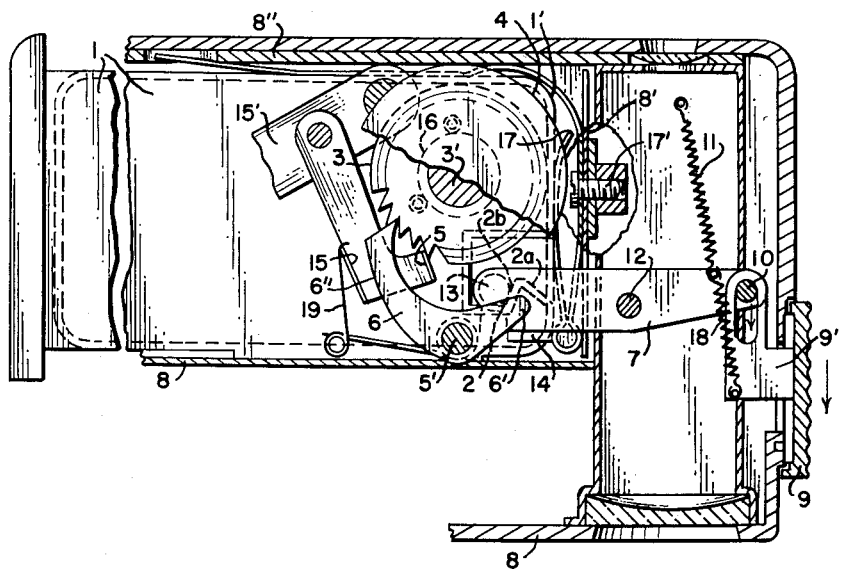
FIG. 1 is a plan view of an embodiment of the present invention, portions of the camera body being deleted and other portions being shown in section to better reveal the construction.

Referring now to the drawing, the preferred form of the invention there illustrated includes a camera body consisting of outside and median walls 8, in which there in formed in a portion thereof a large recess 2, in which there may be positioned a film magazine 1 which may contain film ready for exposure, and means (not shown) to transport said film, which magazine has formed in a rear upper surface thereof, towards and in communication with rear end portion 1' of said magazine, a recess having a serrate step 2', the step having a distal gently inclined cam defining slope 2a and an interior proximal more acutely inclined slope 2b, said recess thus being somewhat hook-shaped in section. A latch lever 7 is pivotally mounted to the camera body by means of pivot pin 12 and is spring biased in a counterclockwise direction (as shown in FIG. 1) by means of latch lever bias spring 11 connected between the camera body and lever 7, said lever being depressed by means of an arrangement which includes a pin 10 upstanding from an end of said lever which rides within an elongated slot in an L-shaped member 9', which in turn is attached to a slide member 9 extending outside of the camera body, said L-shaped and slide members comprising together a slide. Slide return spring 18 is connected between lever 7 and L-shaped member 9' to return slide 9 to its normal position after it has been displaced in a direction of the arrow shown in FIG. 1.

Proximate the inner end and opposite the end upon which pin 10 is located, and extending downwardly from latch lever 7, is a latch pin 13 positioned and dimensioned to lie in the path of the step 2' in said recess in said magazine when the same is inserted into the camera and then, by reason of the bias upon latch lever 7, to ride along the distal inclined portion 2a of said step and down along the proximal wall to latch said magazine in place within said camera.

A strong ejection spring 17 is positioned against the end wall 8' of the large recess 2 in which magazine 1 may be inserted and secured thereto by means of screw 17', and extends along the rear wall 8" of said large recess 2, the portion of said spring along said rear wall 8" being bent inwardly so as to place magazine 1 against the opposing median wall 8 and seat it snugly within said large recess.

The portion of ejection spring 17 positioned against the end of said large recess 2 is generally U-shaped and abuts the end of the magazine when the same is inserted in the camera body and is compressed by reason of such insertion. A ratchet wheel 3 is rotatably mounted to the camera body by means of axle 3' and bears pinned to its upper surface a counter wheel or disk 4 which bears numbers indicating film frames and which may be observed from outside of the camera body through an opening therein (not shown).

A drive pawl 5 is pivotally connected to a lever 15' which in turn is synchronized with a film transport means (not shown), said pawl being biased against the teeth of ratchet wheel 3 by means of a spring 19, and as said pawl is displaced rearwardly (upwardly in FIG. 1) rotates said pawl and counter disk. A zero biasing spring 16 urges said ratchet wheel and counter disk towards the zero position, which is the normal or reset position, and a detent pawl 6 in the form of a bell crank lever, which is pivotally mounted to the camera body by means of pin 5', the longer arm thereof being biased into contact with the teeth of ratchet wheel 3 by means of spring 20, acts to prevent said ratchet wheel 3 from returning to the zero or reset position by reason of the biasing action of spring 16.

Figure 2:
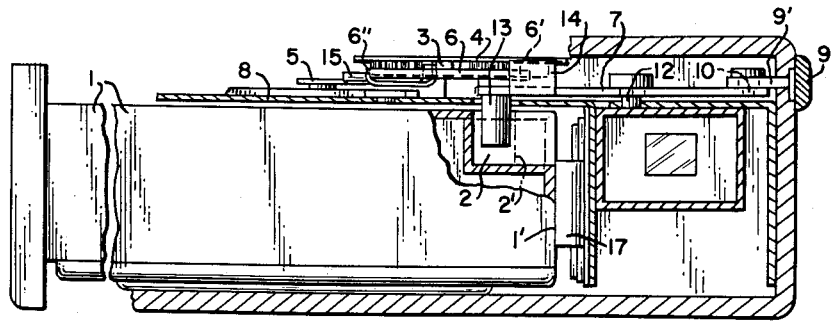
FIG. 2 is an elevational view thereof partly in section.

In operation, magazine 1 is pushed into the large recess 2 of the camera body, its end portion 1' contacting spring 17 and compressing it while at the same time latch pin 13 rides along the distal slope 2a and then down the proximal edge of serrate step 2', being urged downwardly against the forward wall of said recess by means of the bias of spring 11 which urges latch lever 7 in a counterclockwise direction and thus latching or locking said magazine into place in the camera. As pin 13 rides rearwardly (upwardly as seen in FIGURE 1) along the distal inclined wall 2a, a contact member 14, projecting upwardly, as seen in FIGURE 2, from an inner forward portion of latch lever 7, contacts the shorter arm 6' of detent pawl 6 displacing said pawl in a counterclockwise direction (as shown in FIG. 1), thus removing the end of the longer arm of said pawl from contact with the teeth of ratchet wheel 3, and thus freeing the ratchet wheel from the detent action of said pawl 6. At the same time as said pawl 6 is rotated in a counterclockwise direction, its lateral edge 6" contacts an upstanding portion 15 of driving pawl 5, pushing said pawl away from contact with the teeth of ratchet wheel 3 (against the bias of spring 19) and thus freeing wheel 3 from contact with pawl 5. Thus, the ratchet wheel 3 being unimpeded by the pawls 5 and 6, is returned by the spring 16 to its zero position, as aforesaid, carrying the counter disc therewith. Magazine 1 is automatically ejected from the camera body when the operator pushes slide member 9 in a forward direction, causing latch lever 7 to be displaced in a clockwise direction (as shown in FIG. 1) thus displacing pin 13 rearwardly free of step 2' and freeing it of the latching action of the system described and permitting ejection spring 17 to push and thus automatically eject magazine 1 from the camera body.

It will be noted that as latch lever 7 is rotated in said clockwise direction, the action of contact between contact member 14 and the shorter arm 6' of detent pawl 6 is repeated and ratchet wheel 3 and counter disk 4 are freed of the detent actions of pawl 6 and pawl 5 as well, and are returned to the zero position.

Details with respect to the cooperating parts of a camera, in which the embodiment of the present invention here described in detail may be employed, are contained in my copending applications filed simultaneously herewith, Serial No. 801,285 entitled Related Film Transport Shutter Setting and Film Counter Means, Serial No. 801,290 entitled Shutter for Photographic Cameras, Serial No. 801,289, now Patent No. 2,960,922 entitled Flash Synchronizing Device for Cameras, Serial No. 801,288 entitled Device for Preventing the Overwinding of Film and the Premature Release of the Shutter in a Photographic Camera, and Serial No. 801,286 entitled Magazine for Photographic Cameras.

Although the present invention has been described with a certain degree of particularity, it is understood that the present disclosure has been made only by way of example and that numerous variations may be employed without transcending the scope of the invention as hereinafter claimed.

What is claimed is:

1. In a camera including a body member, a frame counting mechanism mounted on said body member comprising a film magazine movable between a retracted and an inserted position in said body member, spring means normally urging said film magazine toward its retracted position, a latch member movable between latch and unlatch positions releasably engaging and locking said magazine in its inserted position, a cam member carried by said magazine and adapted to engage said latch member and move said latch member between its latch and unlatch positions upon insertion of said magazine, a counting member including a ratchet wheel rotatable between retracted and advanced positions and spring urged to its retracted position, a hold pawl releasably engaging said ratchet wheel and normally preventing its return movement, and a pawl release element connected to and movable with said latch member and engaging said hold pawl to move said pawl out of engagement with said ratchet wheel upon movement of said latch member toward its unlatch position.

2. In a camera including a body member, a frame counting mechanism mounted on said body member comprising a film magazine movable between a retracted and an inserted position in said body member, spring means normally urging said film magazine toward its retracted position, a latch member movable between latch and unlatch positions releasably engaging and locking said magazine in its inserted position, a cam member carried by said magazine and adapted to engage said latch member and move said latch member between its latch and unlatch positions upon insertion of said magazine, a counting member including a ratchet wheel rotatable between retracted and advanced positions and spring urged to its retracted position, a hold pawl releasably engaging said ratchet wheel and normally preventing its return movement, a reciprocable advancing pawl releasably engaging said ratchet wheel, a pawl release element connected to and movable with said latch member and engaging said hold pawl to move said hold pawl out of engagement with said ratchet wheel upon movement of said latch member toward its unlatch position and means coupling said advancing pawl to said hold pawl and urging said advancing pawl out of engagement with said ratchet wheel upon disengagement thereof by said hold pawl.

3. A camera frame counting mechanism in accordance with claim 2 wherein said advancing pawl disengagement means includes an abutment element mounted on and movable with said advancing pawl, said abutment element being disposed in the path of said hold pawl.

4. A camera frame counting mechanism in accordance with claim 2 including spring means urging said latching member toward its lock position.

5. A camera frame counting mechanism in accordance with claim 2 including a bell crank pivoted at its knee, one of the arms of said crank defining said hold pawl, and said hold pawl disengaging means includes a contact member engaging the other arm of member crank.

6. A camera frame counting mechanism in accordance with claim 2 including a stepped member located at the inner end of said magazine, said latching member having a hooked end releasably engaging said stepped member.

7. A camera frame counting mechanism in accordance with claim 6 wherein the leading face of said stepped member is relatively upwardly inwardly inclined to define said cam member.

8. A camera frame counting mechanism in accordance with claim 2 wherein said magazine urging spring means is defined by a leaf spring flexed by said magazine upon movement to its inserted position.

References Cited in the file of this patent

UNITED STATES PATENTS

| | | |
|---|---|---|
| 2,172,337 | Mihalyi | Sept. 5, 1939 |
| 2,282,044 | Fairbanks | May 5, 1942 |
| 2,282,051 | Helbing et al. | May 5, 1942 |
| 2,464,790 | Bolsey | Mar. 22, 1949 |
| 2,553,656 | Kirby | May 22, 1951 |
| 2,577,160 | Simmon | Dec. 6, 1951 |